United States Patent
van Riel (10) Patent No.: US 9,471,228 B2
(45) Date of Patent: Oct. 18, 2016

(54) CACHING POLICIES FOR SOLID STATE DISKS

(71) Applicant: Red Hat, Inc., Raleigh, NC (US)

(72) Inventor: Henri van Riel, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 149 days.

(21) Appl. No.: 14/548,863

(22) Filed: Nov. 20, 2014

(65) Prior Publication Data

US 2016/0147443 A1 May 26, 2016

(51) Int. Cl.
*G06F 3/06* (2006.01)

(52) U.S. Cl.
CPC ............ *G06F 3/061* (2013.01); *G06F 3/0635* (2013.01); *G06F 3/0685* (2013.01); *G06F 2212/214* (2013.01)

(58) Field of Classification Search
None
See application file for complete search history.

(56) References Cited

U.S. PATENT DOCUMENTS

| 8,230,123 | B2* | 7/2012 | Chiu | G06F 3/0605 710/8 |
| 2011/0138106 | A1* | 6/2011 | Prabhakaran | G06F 12/0804 711/103 |
| 2013/0086302 | A1* | 4/2013 | Tressler | G06F 3/0679 711/103 |
| 2014/0108727 | A1* | 4/2014 | Sakashita | G06F 12/0862 711/118 |
| 2015/0074340 | A1* | 3/2015 | Criswell | G06F 12/0868 711/103 |

OTHER PUBLICATIONS

Mesnier et al. "Differentiated storage services". Oct. 2011. p. 57-70. SOSP '11 Proceedings of the Twenty-Third ACM Symposium on Operating Systems Principles. New York, NY, USA.*
Welch et al. "Optimizing a hybrid ssd/hdd hpc storage system based on file size distributions". May 2013. 2013 IEEE 29th Symposium on Mass Storage Systems and Technologies (MSST). Long Beach, CA, USA.*

* cited by examiner

*Primary Examiner* — Reginald Bragdon
*Assistant Examiner* — James J Thomas
(74) *Attorney, Agent, or Firm* — Lowenstein Sandler LLP (57) ABSTRACT

Aspects of the disclosure provide for caching policies for solid state drives. A method of the disclosure includes receiving a request to perform a write operation of a first size; determining, by a processing device, a threshold of input/output I/O size in view of an average bandwidth of a solid state drive (SSD) and information related to I/O operations performed by at least one of the SSD or a hard disk drive (HDD); comparing the first size with the threshold of I/O size; and determining, by the processing device, whether the write operation is to be performed on the SSD or on the HDD in view of the comparison.

20 Claims, 5 Drawing Sheets

```
┌─────────────────────────────────────────────────────────────────────┐
│              Determine an average bandwidth for an SSD              │
│                                                                 310 │
└─────────────────────────────────────────────────────────────────────┘
                                     ▼
┌─────────────────────────────────────────────────────────────────────┐
│  Determine an amount of bandwidth reserve for the SSD (See, e.g., Figure 4) │
│                                                                 320 │
└─────────────────────────────────────────────────────────────────────┘
                                     ▼
┌─────────────────────────────────────────────────────────────────────┐
│              Determine an available bandwidth of the SSD            │
│                                                                 330 │
└─────────────────────────────────────────────────────────────────────┘
                                     ▼
┌─────────────────────────────────────────────────────────────────────┐
│ Determine a threshold of I/O size in view of the available bandwidth of the SSD │
│                                                                 340 │
└─────────────────────────────────────────────────────────────────────┘
```

```
┌─────────────────────────────────────────────────────────────────┐
│ Analyze information related to I/O operations performed by an   │
│ SSD and/or an HDD                                               │
│                                                           410   │
└─────────────────────────────────────────────────────────────────┘
                              │
                              ▼
┌─────────────────────────────────────────────────────────────────┐
│ Determine a current bandwidth usage for the SSD                 │
│                                                           420   │
└─────────────────────────────────────────────────────────────────┘
                              │
                              ▼
┌─────────────────────────────────────────────────────────────────┐
│ Calculate a difference between the current bandwidth usage and  │
│ an average bandwidth of the SSD                                 │
│                                                           430   │
└─────────────────────────────────────────────────────────────────┘
                              │
                              ▼
┌─────────────────────────────────────────────────────────────────┐
│ Update an amount of bandwidth reserve of the SSD based on the   │
│ difference between the current bandwidth usage and the average  │
│ bandwidth of the SSD                                            │
│                                                           440   │
└─────────────────────────────────────────────────────────────────┘
```

CACHING POLICIES FOR SOLID STATE DISKS

TECHNICAL FIELD

Aspects of the disclosure relate generally to solid state disks (SSDs) and, more specifically, to applying caching policies for SSDs.

BACKGROUND

Unlike traditional hard disk drives (HDDs) that contain spinning disks and moveable read/write heads, solid state disks (SSDs) do not have moving parts and store data in NAND flash memory arrays. Because of this, an SSD may process input/output (I/O) requests significantly faster than an HDD. However, an SSD may have a much more limited write endurance than an HDD. The life span of an SSD can be expressed as a function of an amount of data that can be written to the SSD. As such, the amount of wear on an SSD is primarily caused by the amount of data written to the SSD rather than by the number of I/O operations performed on the SSD.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the disclosure provide for caching policies for a solid state drive (SSD). A computer system (e.g., specifically a file system that processes large volumes of database transactions, etc.) may have to process input/output (I/O) requests of various sizes. For example, the system may perform 10000 I/O operations of 4 kilobytes during a period of time (e.g., by writing and/or reading 40 megabytes of data). Meanwhile, the computer system may perform 2000 I/O operations of 64 kilobytes during the period of time (e.g., by writing and/or reading 128 megabytes of data). As such, performing a large number of small I/O operations to a storage device (e.g., an SSD) might consume a less amount of bandwidth of the storage device than performing a small number of large I/O operations to the storage device. Prior solutions for SSD caching fail to provide write caching policy functionality for such a computer system. Moreover, prior solutions for SSD fail to provide caching policies for SSDs in a dynamic manner.

Aspects of the disclosure address the above deficiencies by tracking information related to I/O operations performed on the SSD and dynamically applying a caching policy in view of the information. For example, a threshold of I/O size may be determined in view of information related to the SSD's write endurance, I/O requests processed by the SSD, etc. In one embodiment, a write operation of a given size may be performed on the SSD when the size of the write operation is not greater than the threshold. Data associated with the write operation may be stored in the SSD and may be subsequently transferred to the HDD (e.g., on demand, periodically, etc.). Alternatively, the write operation may be performed on the HDD when the size of the write operation is greater than the threshold. Data associated with the write operation may bypass the SDD and may be written to the HDD.

Aspects of the disclosure improve write performance of the SSD by dynamically tuning a write caching policy for the SSD in view of information related to the SSD's write endurance, I/O requests processed by the SSD, etc. As such, write operations can be performed on the SSD at a high speed without degrading the SSD's life span.

Figure 1:
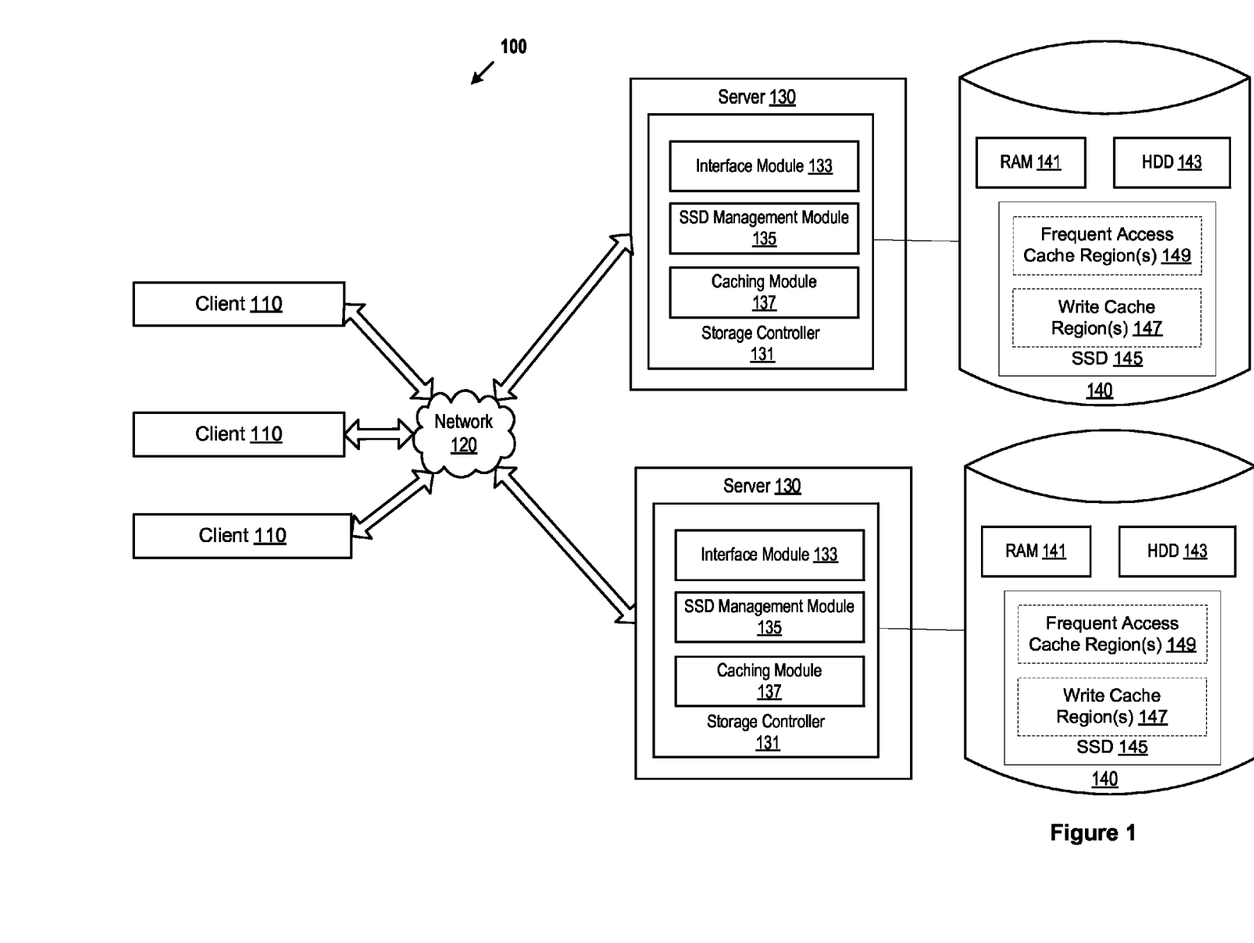
FIG. 1 is a block diagram of an example of a system in which embodiments of the disclosure may operate.

FIG. 1 is a block diagram of a system 100 in which implementations of the disclosure may operate. System 100 may include, but is not limited to, one or more clients 110 communicatively coupled to one or more servers 130 over a network 120. The network 120 may be a private network (e.g., a local area network (LAN), a wide area network (WAN), intranet, etc.), a public network (e.g., the Internet), or a combination thereof. Network 120 may include a wireless infrastructure, which may be provided by one or multiple wireless communication systems, such as a Wi-Fi hotspot connected with the network 120 and/or a wireless carrier system that can be implemented using various data processing devices, communication towers, etc.

Each client 110 may be provided by a computer system including a processor, a memory, at least one communication interface, and/or any other components (not shown in FIG. 1). For example, each client 110 may be a personal computer (PC), palm-sized computing device, personal digital assistant (PDA), tablet computing device, mobile phone, wearable computing device, and so on. In some implementations, each client 110 can be and/or include one or more computer systems as described below in connection with FIG. 5.

Each server 130 may include one or more physical devices (not shown), which can be one or more processing devices, storage devices, audio/video devices (e.g., video cards, sound cards, etc.), network interface devices, printers, graphics modules, graphics devices, system components (e.g., PCI devices, bridges, ports, buses, etc.), etc. Each server 130 may include any number of devices. Each server 130 may include, and is not limited to one or more computer systems, such as a desktop computer, a laptop computer, a mainframe computer, a personal digital assistance, a handheld device and/or any other device capable of processing data. In some implementations, each server 130 can be and/or include one or more computer systems as described below in connection with FIG. 5.

Each server 130 may include and/or be communicatively coupled to one or more storage devices 140. Storage device 140 may be and/or include one or more devices capable of storing data, such as a magnetic or optical storage based disk, RAID array, EEPROM device, etc. In some examples, storage device 140 may include a random access memory (RAM) device 141, a hard disk drive (HDD) 143, and a solid state drive (SSD) 145. The RAM 141 may store data that are currently being used or that are frequently used by one or more components of the server 130. Data stored in the RAM 141 may be lost when the server 130 reboots.

Each server 130 may include a storage controller 131 that may include an interface module 133, an SSD management module 135, a caching module 137, and/or any other suitable module or component for controlling one or more storage devices 140. In one example, the storage controller 131 may be implemented using an operating system kernel, application, or any other software. In another example, the storage controller 131 may be implemented as a disk controller firmware of the server 130.

The interface module 133 may communicate with one or more components of system 100. For example, the interface module 133 may receive and/or process input/output (I/O) requests, such as requests to perform write operations, requests to perform read operations, etc. The I/O requests may be initiated by any component of system 100 (e.g., one or more clients 110, one or more servers 130, etc.) and/or any other computer system. As another example, the interface module 133 may transfer data for storage in the SSD 145, the HDD 143, and/or any other component of the storage device 140 (e.g., via a bus).

The SSD management module 135 may divide the SSD 145 into multiple cache regions, such as one or more write cache regions 147 and/or one or more frequent access cache regions 149. In some implementations, the SSD 145 may be divided into any number of write cache regions and/or frequent access cache regions. Each of the write cache regions and/or the frequent access cache regions may have any suitable size, such as a predetermined size or a size that is determined by the SSD management module 135 dynamically (e.g., at runtime). The division can be performed using the Adaptive Replacement Cache (ARC) algorithm, the Clock with Adaptive Replacement (CAR) algorithm, and/or any other suitable algorithm that can be used to divide an SSD cache into multiple frequent access cache regions and/or write cache regions.

The frequent access cache region(s) 149 may contain blocks of data that are accessed frequently for I/O operations (e.g., write operations, read operations, etc.). For example, the frequent access cache region(s) 149 may store data that are frequently accessed by an operating system of the server 130, one or more applications running on the server 130 (not shown in FIG. 1), and/or any other component of the server 130. The write cache region(s) 147 may be used to perform write operations (e.g., writes of data blocks that are not frequently accessed, writes of data blocks that are not accessed frequently enough to be stored in the frequent access cache region(s) 149, etc.).

In some implementations, one or more portions of data stored in one or more of the write cache region(s) 147 and/or the frequent access cache region(s) 149 may be transferred to other cache region(s) of the SSD 145 and/or other component(s) of the storage device 140. For example, the SSD management module 135 may transfer one or more portions of the data to the HDD 143 in response to detecting a predetermined event (e.g., the amount of data in the write cache region(s) 147 and/or the frequent access cache region(s) 149 exceeding a threshold amount). As another example, the SSD management module 135 may transfer one or more portions of the data to the HDD 143 periodically, on demand, at random time instances, and/or at any other suitable time. In some implementations, data transferred from the SSD 145 to another storage device may be transferred back to the SSD 145. For example, the SSD management module 135 may determine that data that has been transferred from the SSD 145 to another storage device (e.g., the HDD 143) has been accessed by one or more components of the server 130. The SSD management module 135 may then transfer the data back to the SSD 145 and store the data in the SSD 145 (e.g., one or more frequent access cache regions 149).

The caching module 137 may apply caching policies for one or more components of the storage device 140. For example, upon receiving an instruction to perform a write operation of a given size (e.g., 4 kilobytes, 1 megabytes, etc.), the caching module 137 may determine whether the write operation is to be performed on the SSD 145 or on the HDD 143. More particularly, for example, upon receiving an instruction to perform the write operation, the caching module 137 may determine whether the write operation is associated with one or more blocks that are present in one or more cache regions of the SSD 145 (e.g., one or more blocks of data contained in the frequent access cache region(s) 149). In response to determining that the write operation is associated with one or more blocks that are present in one or more cache regions of the SSD 145, the caching module 137 may perform the write operation on the SSD 145 (e.g., by writing data associated with the write operation to the frequent access cache region(s) 149).

Alternatively or additionally, the caching module 137 may determine a threshold of I/O size and apply a caching policy in view of the determined threshold. The caching module 137 may then compare the threshold with the size of the write operation and may apply a caching policy in view of the comparison. For example, the caching module 137 may determine that the write operation is to be performed on the SSD 145 in response to determining that the size of the write operation is not greater than the threshold. More particularly, for example, data associated with the write operation may be written to the write cache region(s) 147. The data may be subsequently written to the HDD 143 on demand, periodically, at random times, in any other manner. In another example, the caching module 137 determines that the write operation is to be performed on the HDD 143 in response to determining that the size of the write operation is greater than the threshold. More particularly, for example, data associated with the write operation may bypass the SDD 145 and may be written to HDD 143.

The caching module 137 may determine a threshold of I/O size for the SSD 145 periodically (e.g., every few seconds, every few minutes, every hour, etc.), at random times, etc. Alternatively or additionally, a threshold of I/O size can be determined for the SSD 145 in response to detecting a predetermined event (e.g., receiving an I/O request).

The caching module 137 may determine a threshold of I/O size for the SSD 145 in view of information related to I/O operations to the SSD device 145 and/or to the HDD 143, a life span of the SSD 145, a write endurance of the SSD 145, and/or any other suitable information that may be used to determine a caching policy for the SSD 145.

For example, the caching module 137 may determine an average bandwidth that indicates a write rate at which data can be written to the SSD 145 (e.g., 2 megabits per second (Mbit/s), 5 Mbit/s, etc.). In one embodiment, the average bandwidth may be determined in view of a life span of the SSD 145 (e.g., three years, five years, or any other suitable time period) and/or an amount of data that can be written to the SSD 145 (e.g., the SSD's write endurance). More particularly, the caching module 137 may determine the average bandwidth by dividing the life span of the SSD 145 by the write endurance of the SSD 145. In some implementations, the life span of the SSD 145 may be set by a user.

The caching module 137 may also determine an amount of bandwidth reserve indicative of an amount of bandwidth surplus or an amount of bandwidth deficit of the SSD 145 during a given period of time (e.g., a few picoseconds, a few seconds, a few minutes, an hour, etc.). For example, the caching module 137 may determine a value of bandwidth surplus or deficit of the SSD 145 at a given time (e.g., by calculating a difference between the average bandwidth of the SSD 145 and a current bandwidth usage of the SSD). The caching module 137 may also determine multiple values of bandwidth surplus or deficit of the SSD 145 corresponding to multiple time instances during the period of time. The caching module 137 may then determine amount of bandwidth reserve of the SSD 145 during the period of time by combining the multiple values of bandwidth surplus or deficit (e.g., calculating a sum of the values, calculating an integral over time of a function representative of an amount of bandwidth reserve of the SSD 145 over time, etc.). In some implementations, the amount of bandwidth reserve may be determined by performing one or more operations described below in connection with FIG. 4.

The caching module 137 may then determine an available bandwidth of the SSD 145. For example, the caching module 137 may determine a combined value of the average bandwidth and the amount of bandwidth reserve. More particularly, for example, the combined value can be determined by adding the amount of bandwidth reserve to the average bandwidth in some implementations in which the amount of bandwidth reserve indicates an amount of bandwidth surplus of the SSD 145 during the period of time. In another example, the combined value can be determined by subtracting the amount of bandwidth reserve from the average bandwidth in some implementations in which the amount of bandwidth reserve indicates an amount of bandwidth deficit during the period of time.

The caching module 137 may then determine the available bandwidth of the SSD 145 in view of the combined value and any other information related to uses of the SSD's bandwidth, such as an amount of the SSD's bandwidth that is used to manage the frequent access cache region(s) 149 and/or perform any other tasks. For example, the available bandwidth may be determined by subtracting the amount of the SSD's bandwidth that is used to manage read operations or perform any other tasks from the combined value.

In some implementations, the caching module 137 may determine an amount of bandwidth of the SSD 145 that is used to perform write operations of various sizes during a time period (e.g., one second, a few seconds, an hour, etc.). The caching module 137 may then compare the amount of bandwidth with the available bandwidth to determine a threshold of I/O size. For example, the caching module 137 may determine that an amount of bandwidth that is used to perform write operations smaller than a given size is the same as the available bandwidth. The caching module 137 may then determine that the given size is the threshold of I/O size. In some implementations, an amount of bandwidth used to perform one or more operations may be regarded as being the same as the average bandwidth when a difference between the amount of bandwidth and the average bandwidth is not greater than a predetermined value.

In some implementations, an amount of bandwidth of the SSD 145 that is used to perform write operations of various sizes may be determined using any suitable technique or combination of techniques. For example, the caching module 137 may analyze information related to write operations performed to the SSD 145 and/or to the HDD 143 during a time period, such as a size of each of the write operations (e.g., 2 kilobytes, 1 megabytes, etc.), a range of sizes associated with each of the write operations (e.g., between 2 kilobytes and 4 kilobytes), the number of the write operations of a particular size or range of sizes during the time period (e.g., N numbers of write operations per second, N number of write operations per hour, N number of write operations during three hours, etc.), etc. In one embodiment, for each of the various sizes, the caching module 137 may determine an amount of the SSD's bandwidth that is used to perform write operations of that size by multiplying the size by the number of the write operations of the size. The caching module 137 may then determine a total amount of the SSD's bandwidth that is used to perform write operations of the various sizes by calculating a sum of the SSD's bandwidth used to perform write operations of each the various sizes.

Figure 2:
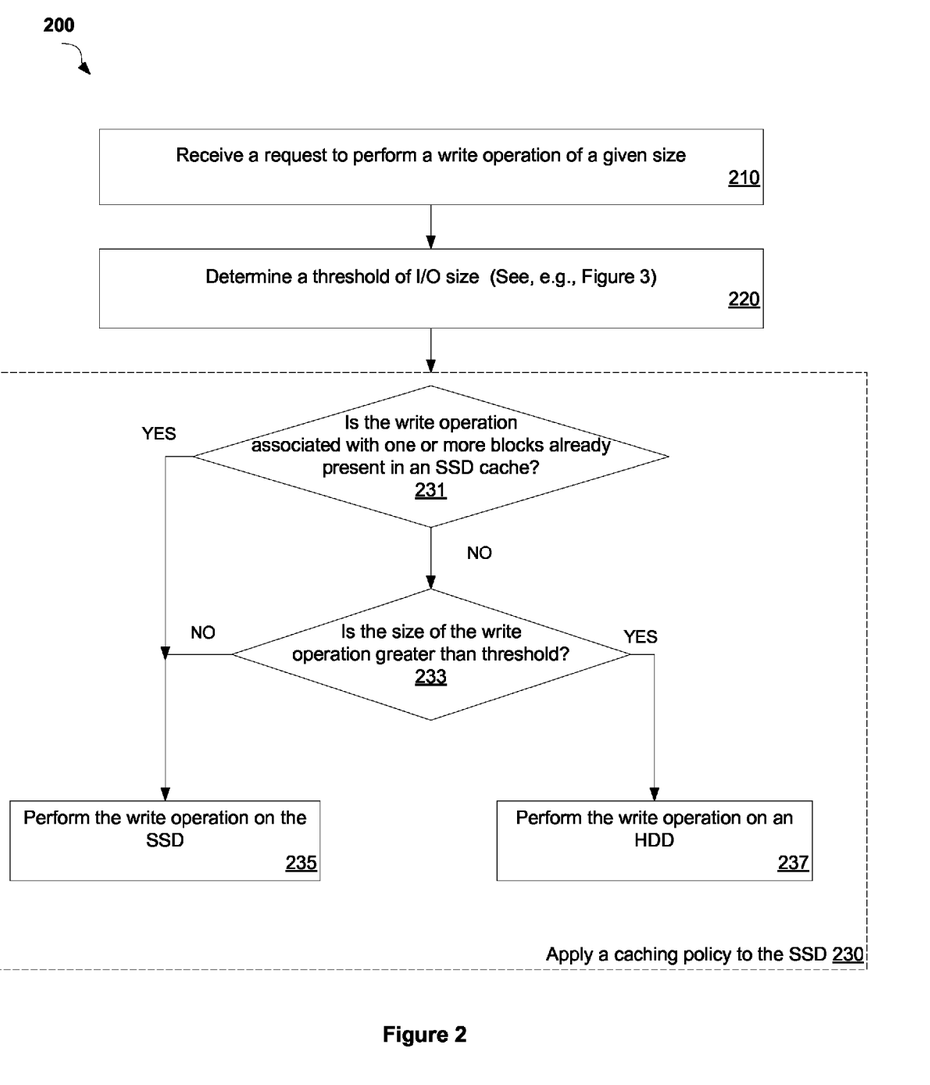
FIG. 2 is a flow diagram illustrating an example of a method for applying caching policies to an SSD according to an embodiment of the disclosure.

FIG. 2 is a flow diagram illustrating a method 200 for providing caching policies for a solid state drive (SSD) according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by a processing device (e.g. a processing device 502 of FIG. 5) executing the storage controller 131 as described in connection with FIG. 1.

Method 200 begins at block 210 where the processing device receives a request to perform a write operation of a given size (e.g., 4 kilobytes, 8 kilobytes, 1 megabytes, etc.).

At block 220, the processing device can determine a threshold of I/O size. For example, the processing device can determine the threshold in view of an average bandwidth of the SSD, an amount of bandwidth reserve of the SSD, information related to I/O operations to the SSD, and/or any other suitable information that can be used to determine the threshold. More particularly, for example, the processing device can determine the threshold by performing one or more operations described below in connection with FIG. 3.

At block 230, the processing device can apply a caching policy to the SSD. For example, the processing device can determine whether the write operation is to be performed on the SSD or on an HDD in view of the determined threshold, blocks of data associated with the write operations, etc. In some implementations, the caching policy can be applied by performing one or more operations depicted in blocks 231-237.

At block 231, the processing device can determine whether the write operation is associated with one or more blocks that are present in one or more cache regions of the SSD (e.g., one or more blocks of data contained in the frequent access cache region(s) 149 of FIG. 1). In response to determining that the write operation is associated with one or more blocks that are present in a cache region of the SSD, the processing device can proceed to block 235 and perform the write operation on the SSD.

Alternatively, at 233, the processing device can determine whether the size of the write operation is greater than the threshold in response to determining that the write operation is not associated with one or more blocks present in cache regions of the SSD. In response to determining that the size of the write operation is not greater than the threshold, the processing device proceeds to block 235 and instructs the SSD to perform the write operation. More particularly, for example, data associated with the write operation may be written to the SSD and may be stored in one or more write cache regions of the SSD. Alternatively, the processing device proceeds to block 237 and instructs the HDD to perform the write operation in response to determining that the size of the write operation is greater than the threshold. More particularly, for example, data associated with the write operation may be stored in the HDD.

Figure 3:
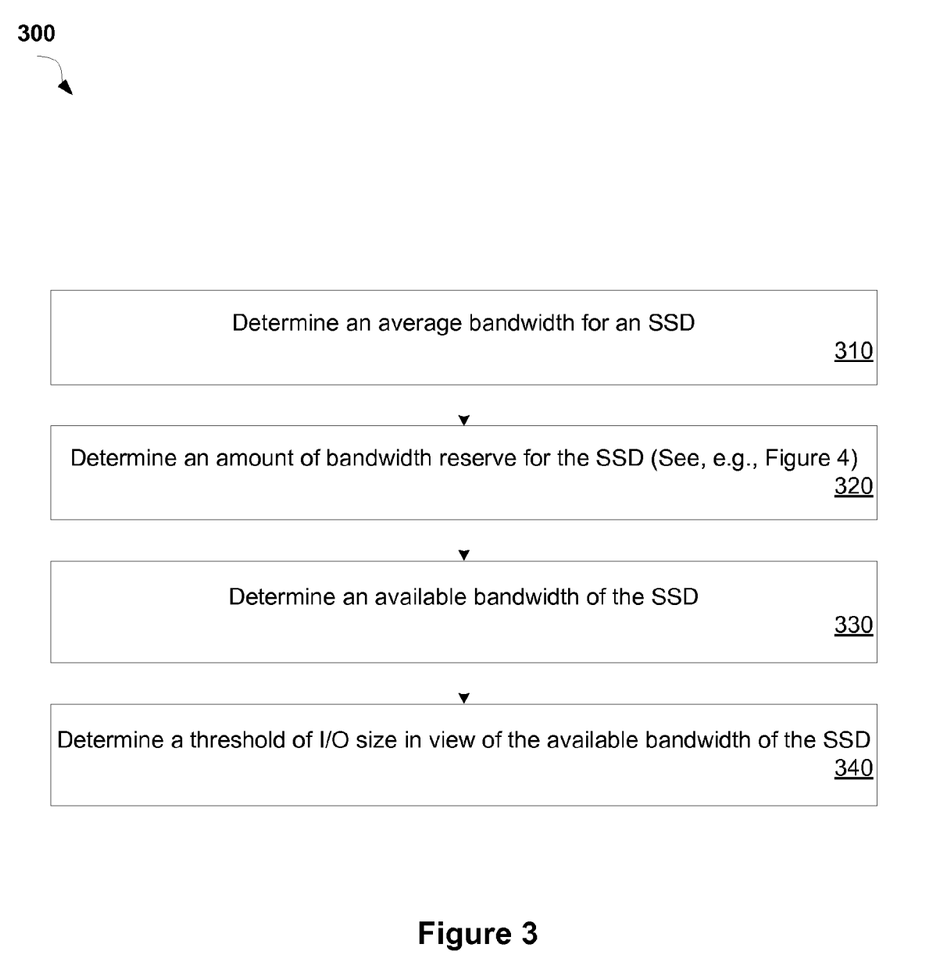
FIG. 3 is a flow diagram illustrating an example of a method for determining a threshold for an SSD according to an embodiment of the disclosure.

FIG. 3 is a flow diagram illustrating a method 300 for determining a threshold to apply caching policies for an SSD according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a processing device (e.g. a processing device 502 of FIG. 5) executing the storage controller 131 as described in connection with FIG. 1.

Method 300 begins at block 310 where the processing device determines an average bandwidth for an SSD. The average bandwidth may indicate a write rate at which data can be written to the SSD. For example, the processing device determines a desired life span of the SSD (e.g., three years, five years, or any other suitable period of time) and an amount of data that can be written to the SSD during the life span of the SSD (e.g., the SSD's write endurance). The life span and/or the write endurance of the SSD may be set by a user in some implementations. The write endurance of the SSD may be detected by an operating system (OS) of the processing device, a software application running on the processing device, etc. The processing device then determines the average bandwidth in view of the desired life span and the write endurance of the SSD. More particularly, for example, the processing device divides the SSD's write endurance by the desired life span to calculate the average bandwidth. The determined average bandwidth may be stored in a storage device (e.g., the memory 504 of FIG. 5, memory 506 of FIG. 5, data storage device 518 of FIG. 5, etc.) for subsequent use.

At block 320, the processing device can determine an amount of bandwidth reserve for the SSD. The amount of bandwidth reserve may indicate an amount of bandwidth surplus or an amount of bandwidth deficit of the SSD during a given period of time. In some implementations, the amount of bandwidth reserve can be determined periodically (e.g., every few seconds, every few minutes, every hour, etc.), on demand, at random times, and/or at any other times. In some implementations, the amount of bandwidth reserve may be determined responsive to a given event (e.g., an I/O request, a request for information related to the amount of bandwidth reserve, etc.). In some implementations, the amount of bandwidth reserve can be determined by performing one or more operations described below in connection with FIG. 4.

At block 330, the processing device may determine an available bandwidth of the SSD. For example, the processing device may determine the available bandwidth in view of the average bandwidth, the amount of bandwidth reserve, an amount of the SSD's bandwidth that is used to manage read operations, and/or information related to the SSD's bandwidth that is used to perform any other task.

More particularly, for example, the processing device may determine a combined value of the average bandwidth and the amount of bandwidth reserve to determine the available bandwidth of the SSD. In one example, the amount of bandwidth reserve may indicate a bandwidth surplus of the SSD during a time period. In such an example, the combined value can be determined as the sum of the average bandwidth and the amount of bandwidth reserve usage. In another example, the amount of bandwidth reserve may indicate a bandwidth deficiency of the SSD during a time period. In such an example, the combined value can be determined by subtracting the amount of bandwidth reserve usage from the average bandwidth.

The processing device may determine the available bandwidth of the SSD by subtracting an amount of the SSD's bandwidth that is used to perform other tasks (e.g., managing one or more frequent access cache regions of the SSD, etc.) for the SSD from the combined value.

At block 340, the processing device may determine a threshold of I/O size in view of the available bandwidth of the SSD. For example, the processing device may determine that an amount of the SSD's bandwidth that is used to perform write operations that are smaller than a given size (e.g., 4 kilobytes, 8 kilobytes, etc.) is the same as the SSD's available bandwidth. The processing device may then determine that the given size as being a threshold of I/O size. In some implementations, an amount of the SSD's bandwidth that is used by one or more write operations may be considered as being the same as the available bandwidth when a difference between the amount of bandwidth and the available bandwidth is smaller than a predetermined value.

Figure 4:
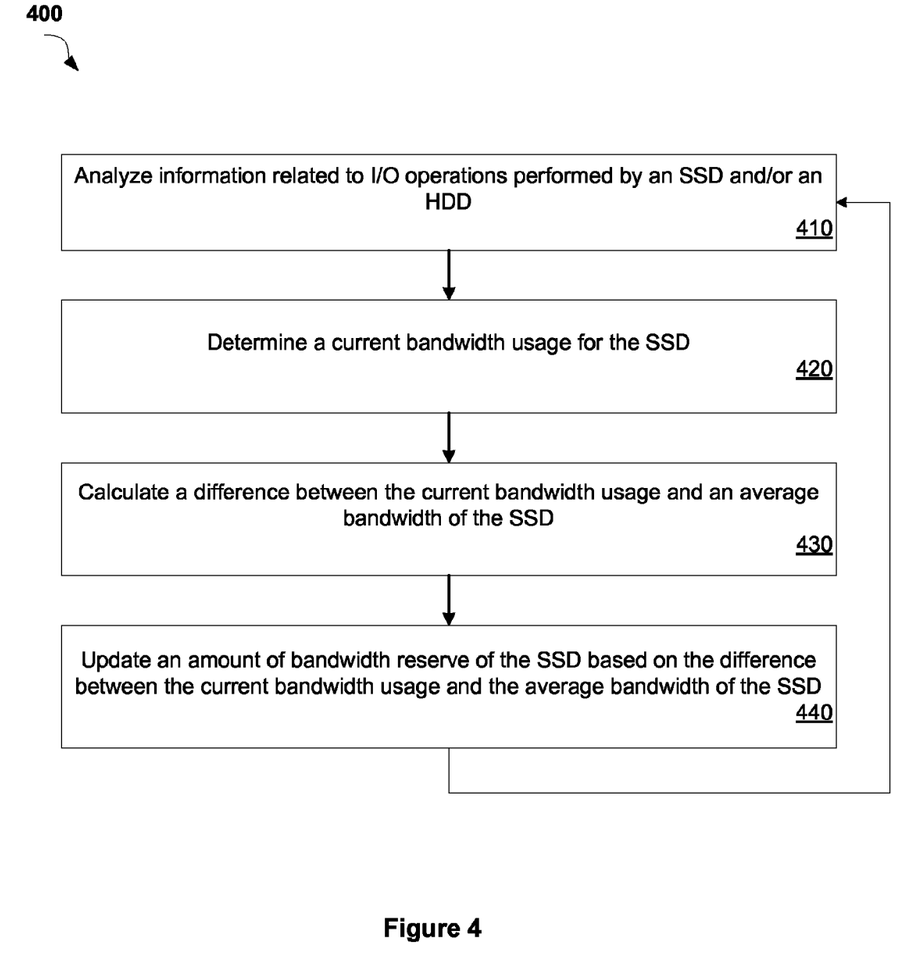
FIG. 4 is a flow diagram illustrating an example of a method for determining an amount of bandwidth reserve for an SSD according to an embodiment of the disclosure.

FIG. 4 is a flow diagram illustrating a method 400 for determining an amount of bandwidth reserve for an SSD according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a processing device (e.g. a processing device 502 of FIG. 5) executing the storage controller 131 as described in connection with FIG. 1.

Method 400 begins at block 410 where the processing device analyzes information related to I/O operations to an SSD and/or an HDD. For example, the processing device may identify I/O operations performed by the SSD and/or the HDD corresponding to various sizes and/or ranges of sizes of I/O operations during a given period of time (e.g., one second, a few seconds, etc.). The processing device then determines a number of I/O operations associated with a given data size (e.g., 4 kilobytes, 8 kilobytes, 64 kilobytes, 1 megabytes, etc.) or a range of data sizes (e.g., between 4 kilobytes and 8 kilobytes, etc.).

At block 420, the processing device determines a current bandwidth usage of the SSD. The current bandwidth usage may indicate an amount of the SSD's bandwidth that is used to perform various tasks (e.g., performing the I/O operations, managing frequent access cache regions, etc.) at a given time or during a time period. For example, the processing device may determine an amount of the SSD's bandwidth that is used to perform I/O operations of a given size by multiplying the number of the I/O operations by the I/O size. The processing device may also determine a total amount of the SSD's bandwidth that is used to perform I/O operations of various sizes by calculating a sum of bandwidth usages corresponding to the various sizes.

At block 430, the processing device can calculate a difference between an average bandwidth of the SSD and the current bandwidth usage. The average bandwidth may indicate a write rate at which data can be written to the SSD (e.g., 2 Mbits/second etc.). In one example, the current bandwidth usage may be less than the average bandwidth. In such an example, the difference may indicate a bandwidth surplus of the SSD. In another example, the current bandwidth usage may be greater than the average bandwidth. In such an example, the difference may indicate a bandwidth deficiency of the SSD.

At block 440, the processing device can update an amount of bandwidth reserve of the SSD in view of the difference between the average bandwidth of the SSD and the current bandwidth usage. For example, the processing device can combine the calculated difference with a current amount of bandwidth reserve of the SSD. In one particular example, the difference between the current bandwidth usage and the average bandwidth indicates a bandwidth surplus. In such an example, the amount of bandwidth reserve of the SSD can be updated by adding the difference to the current amount of bandwidth reserve of the SSD. In another more particular example, the difference between the current bandwidth usage and the average bandwidth indicates a bandwidth deficiency. In such an example, the amount of bandwidth reserve of the SSD can be updated by subtracting the difference from the current amount of bandwidth reserve of the SSD.

Upon performing block 440, the processing device may return to block 410. In one embodiment, the processing device may perform blocks 410-440 periodically (e.g., every few seconds, very few minutes, or any other suitable period of time), at random times, on demand, continuously, or in any other manner.

Figure 5:
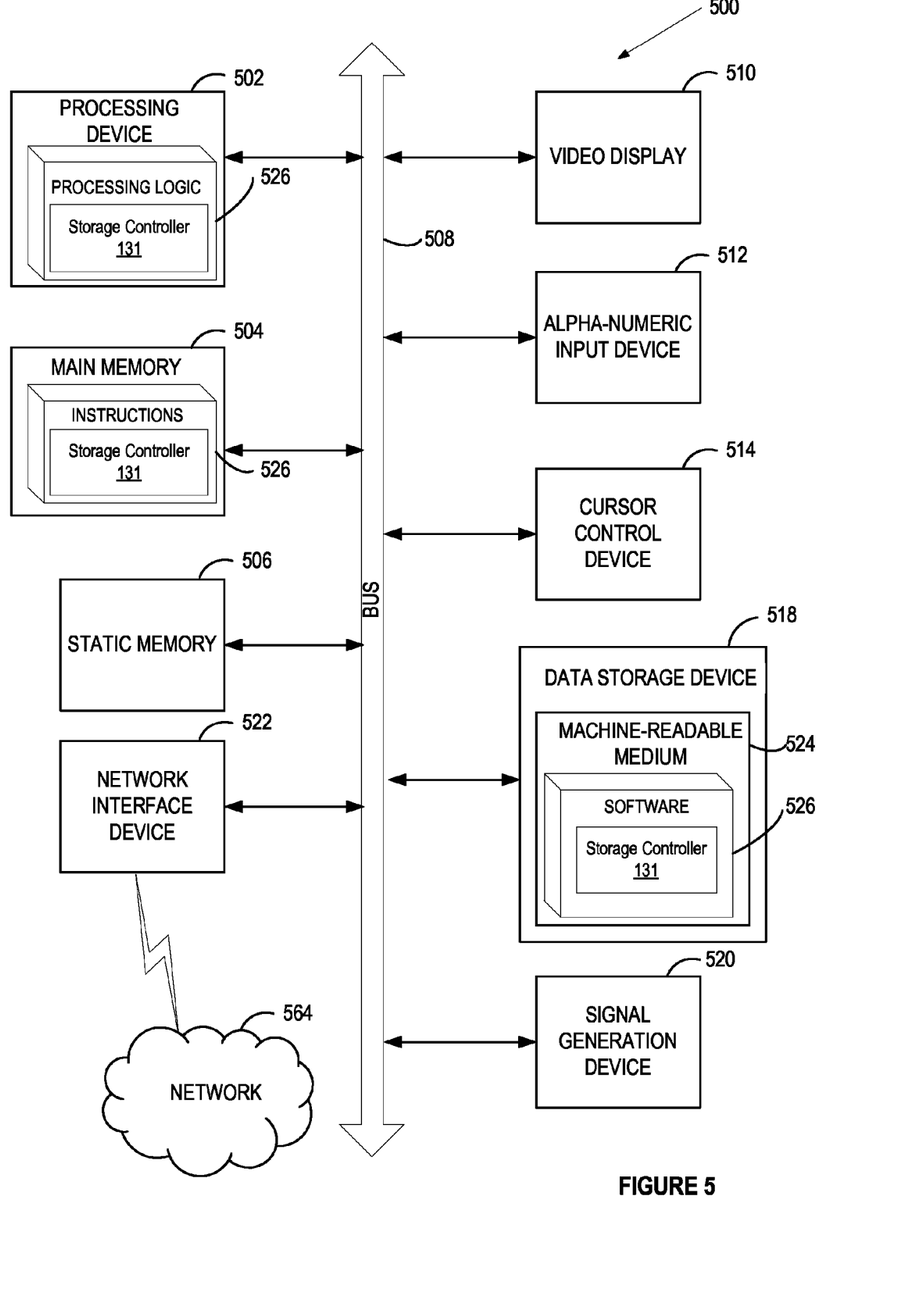
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. The computer system 500 may correspond to one of the clients 110 or one of the servers 130 of FIG. 1. In embodiments of the disclosure, the machine may be connected (e.g., networked) to other machines (e.g., other components of the system 100) in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 502 may therefore include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, system on chip (SoC), or the like.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein (e.g., instructions executed by the storage controller 131 of FIG. 1). The instructions 526 may also reside, completely or at least partially, within the main memory 504 and/or within the processing device 502 during execution thereof by the computer system 500, the main memory 504 and the processing device 502 also constituting machine-readable storage media.

While the computer-readable storage medium 524 is shown in an exemplary embodiment to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid state memories, and optical and magnetic media.

The modules, components and other features described herein (for example in relation to FIGS. 1-4) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding," "receiving," "determining," "routing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   receiving a request to perform a write operation of a first size;
   determining, by a processing device, a threshold of input/output I/O size in view of an average bandwidth of a solid state drive (SSD) and information related to I/O operations performed by at least one of the SSD or a hard disk drive (HDD);
   comparing the first size with the threshold of I/O size; and
   determining, by the processing device, whether the write operation is to be performed on the SSD or on the HDD in view of the comparison.

2. The method of claim 1, further comprising performing, using the processing device, the write operation on the SSD in response to determining that the first size is not greater than the threshold of I/O size.

3. The method of claim 1, further comprising performing, using the processing device, the write operation on the HDD in response to determining that the first size is greater than the threshold of I/O size.

4. The method of claim 1, wherein the average bandwidth indicates a write rate at which data can be written to the SSD.

5. The method of claim 1, wherein calculating the threshold of I/O size further comprises:
   determining an amount of bandwidth reserve that indicates a bandwidth surplus or a bandwidth deficit of the SSD during a time period;
   determining an available bandwidth of the SSD by combining the amount of bandwidth reserve and the average bandwidth; and
   determining the threshold of I/O size in view of the available bandwidth and the information related to I/O operations performed by the SSD and the HDD.

6. The method of claim 5, further comprising:
   determining that an amount of the SSD's bandwidth that is used to perform a plurality of write operations that are smaller than a second size is the same as the available bandwidth; and
   determining that the second size is the threshold of I/O size.

7. The method of claim 5, wherein determining the amount of bandwidth reserve comprises determining a difference between a current bandwidth usage of the SSD and the average bandwidth.

8. The method of claim 1, further comprising:
   determining whether the write operation is associated with one or more blocks that are present in a cache region of the SSD; and
   performing the write operation on the SSD in response to determining that the write operation is associated with one or more blocks that are present in the cache region of the SSD.

9. A system, comprising:
   a memory; and
   a processing device communicably coupled to the memory to:
   receive a request to perform a write operation of a first size;
   determine a threshold of input/output I/O size in view of an average bandwidth of a solid state drive (SSD) and information related to I/O operations performed by at least one of the SSD or a hard disk drive (HDD);
   compare the first size with the threshold of I/O size; and determine whether the write operation is to be performed on the SSD or on the HDD in view of the comparison.

10. The system of claim 9, wherein the processing device is further to perform the write operation on the SSD in response to determining that the first size is not greater than the threshold of I/O size.

11. The system of claim 9, wherein the processing device is further to perform the write operation on the HDD in response to determining that the first size is greater than the threshold of I/O size.

12. The system of claim 9, wherein the average bandwidth indicates a write rate at which data can be written to the SSD.

13. The system of claim 9, wherein the processing device is further to calculate the threshold of I/O size by:
    determining an amount of bandwidth reserve that indicates a bandwidth surplus or a bandwidth deficit of the SSD during a time period;
    determining an available bandwidth of the SSD by combining the amount of bandwidth reserve and the average bandwidth; and
    determining the threshold of I/O size in view of the available bandwidth and the information related to I/O operations performed by the SSD.

14. The system of claim 13, wherein the processing device is further to:
    determine that an amount of the SSD's bandwidth that is used to perform a plurality of write operations that are smaller than a second size is the same as the available bandwidth; and
    determine that the second size is the threshold of I/O size.

15. The system of claim 13, wherein the processing device is further to determine the amount of bandwidth reserve by determining a difference between a current bandwidth usage of the SSD and the average bandwidth.

16. The system of claim 9, wherein the processing device is further to:
    determine whether the write operation is associated with one or more blocks that are present in a cache region of the SSD; and
    perform the write operation on the SSD in response to determining that the write operation is associated with one or more blocks that are present in the cache region of the SSD.

17. A non-transitory machine-readable storage medium including instructions that, when accessed by a processing device, cause the processing device to:
    receive a request to perform a write operation of a first size;
    determine a threshold of input/output I/O size in view of an average bandwidth of a solid state drive (SSD) and information related to I/O operations performed by at least one of the SSD or a hard disk drive (HDD); and
    apply a caching policy to the SSD in view of the first size and the threshold of I/O size.

18. The non-transitory computer readable medium of claim 17, wherein the processing device is further to perform the write operation on the SSD in response to determining that the first size is not greater than the threshold of I/O size.

19. The non-transitory computer readable medium of claim 17, wherein the processing device is further to perform the write operation to the HDD in response to determining that the first size is greater than the threshold of I/O size.

20. The non-transitory computer readable medium of claim 17, wherein the processing device is further to calculate the threshold of I/O size by:
    determining an amount of bandwidth reserve that indicates a bandwidth surplus or a bandwidth deficit of the SSD during a time period;
    determining an available bandwidth of the SSD by combining the amount of bandwidth reserve and the average bandwidth; and
    determining the threshold of I/O size in view of the available bandwidth and the information related to I/O operations performed by at least one of the SSD or the HDD.

* * * * *